United States Patent
Kostello

(10) Patent No.: US 9,946,514 B1
(45) Date of Patent: Apr. 17, 2018

(54) SYSTEMS AND METHODS FOR GENERATING FUNCTIONAL APPLICATION DESIGNS

(71) Applicant: Huma.AI, Palo Alto, CA (US)

(72) Inventor: Gregory Paul Kostello, Palo Alto, CA (US)

(73) Assignee: HUMA.AI, Palo Alto, CA (US)

( * ) Notice: Subject to any disclaimer, the term of this patent is extended or adjusted under 35 U.S.C. 154(b) by 0 days.

(21) Appl. No.: 15/661,605

(22) Filed: Jul. 27, 2017

(51) Int. Cl.
| | |
|---|---|
| G06F 9/44 | (2006.01) |
| G06N 99/00 | (2010.01) |
| G06F 11/36 | (2006.01) |
| G10L 15/22 | (2006.01) |
| G10L 15/18 | (2013.01) |
| G06F 17/27 | (2006.01) |

(52) U.S. Cl.
CPC ............... G06F 8/20 (2013.01); G06F 8/35 (2013.01); G06F 11/3664 (2013.01); G06F 17/278 (2013.01); G06N 99/005 (2013.01); G10L 15/1815 (2013.01); G10L 15/22 (2013.01); *G10L 2015/223* (2013.01)

(58) Field of Classification Search
CPC .......... G06F 8/20; G06F 11/3364; G06F 8/35; G06F 17/278; G06N 99/005; G10L 15/22; G10L 15/1815; G10L 2015/223

USPC ....................................................... 717/105
See application file for complete search history.

(56) References Cited

U.S. PATENT DOCUMENTS

| | | | | |
|---|---|---|---|---|
| 6,950,793 | B2 * | 9/2005 | Ross | G10L 15/1822 704/270 |
| 7,171,352 | B2 * | 1/2007 | Chang | G06F 8/20 704/10 |
| 8,620,659 | B2 * | 12/2013 | Di Cristo | G06F 17/273 704/251 |
| 2013/0253929 | A1 * | 9/2013 | Weider | G06F 17/30864 704/235 |
| 2013/0297293 | A1 * | 11/2013 | Di Cristo | G06F 17/279 704/9 |

* cited by examiner

*Primary Examiner* — Anna Deng
(74) *Attorney, Agent, or Firm* — Womble Bond Dickinson (US) LLP

(57) ABSTRACT

A method and apparatus for generating functional application designs is described. The method may include receiving one or more natural language utterances corresponding to natural language design commands for editing an application being designed. The method may also include editing one or more components of the application being designed based on each of the natural language utterances. Furthermore, the method may include generating a functional instance of the application being designed.

25 Claims, 8 Drawing Sheets

SYSTEMS AND METHODS FOR GENERATING FUNCTIONAL APPLICATION DESIGNS

TECHNICAL FIELD

Embodiments of the invention relate to the field of software application development, and more particularly, to providing tools for the efficient and intelligent generation of functional software application designs.

BACKGROUND

Software application designs are initially ideas as to what is to be achieved by the software application, and how the software application user interface will appear. A designer will use the idea to create a user interface mockup. The mockup created by the designer can include one or more user interface page(s) sketched by the designer, an image editing application rendering of user interface page(s), or other types of static designs created by a designer. The rendering, however, is static and not functional because it cannot be tested by a user navigating between pages, selecting elements, entering data, etc.

In order to transform the static design into a functioning design, a software developer takes the rendered or sketched user interface page(s), and writes software code to create an implementation of the application design. Based on testing and/or other user feedback, the designer may decide to change one or more elements in the original design, or may decide to change the design all together. The software developer must then re-code one or more elements of the functional version of the application. This process becomes time consuming and expensive as multiple revisions are made throughout an application's design. Furthermore, the ultimate design may not be optimal with respect to achieving its original purpose.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
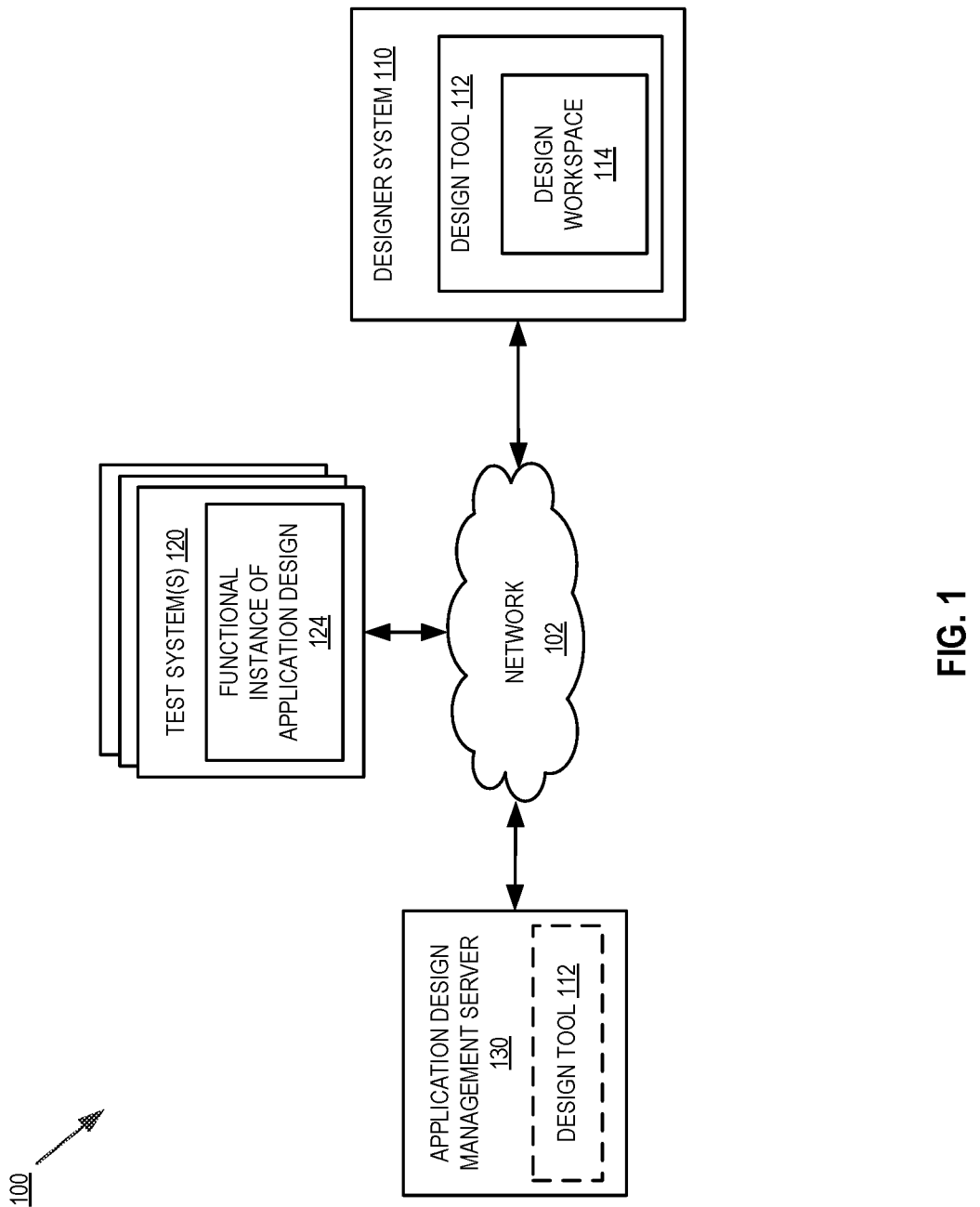
FIG. 1 is a block diagram of an exemplary system architecture for a framework for generating functional application designs.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "editing", "generating", "analyzing", "determining", "executing", "saving", "distributing", "storing", "aggregating", "performing", "presenting", "transforming", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of an exemplary system architecture 100 for a framework for generating functional application designs.

In one embodiment, the system architecture 100 includes a plurality of systems, such as designer system 110, application design management server 130, and one or more test system(s) 120. In one embodiment, designer system 110 and test system(s) 120 may be personal computing devices, such as a desktop computer, laptop computer, tablet computer, mobile computing device, mobile communication device, etc. The application design management server 110 may also be a computing device, such as a server computer, a desktop computer, etc. Additional systems, although not illustrated, may be used in accordance with the discussion herein.

The designer system 110, application design management server 130, and one or more test system(s) 120 may be coupled to a network 102 and communicate with one another using any of the standard protocols for the exchange of information. In one embodiment, one or more of the designer system 110, application design management server 130, and one or more test system(s) 120 may run on one Local Area Network (LAN) and may be incorporated into the same physical or logical system, or different physical or logical systems. Alternatively, the designer system 110, application design management server 130, and one or more test system(s) 120 may reside on different LANs, wide area networks, cellular telephone networks, etc. that may be coupled together via the Internet but separated by firewalls, routers, and/or other network devices. In yet another configuration, the designer system 110, application design management server 130, and one or more test system(s) 120 may reside on the same server, or different servers, coupled to other devices via a public network (e.g., the Internet) or a private network (e.g., LAN). It should be noted that various other network configurations can be used including, for example, hosted configurations, distributed configurations, centralized configurations, virtualized configurations, etc.

In one embodiment, designer system 110 includes design tool 112 for generating a functional software application design. The software application being designed may include any type of software application having a user interface, such as web based applications, mobile device applications, desktop applications, etc. One or more components of design tool 112, as discussed in greater detail herein, may be distributed between designer system 110 and application design management server 130. Regardless of how the design tool 112 is distributed and deployed, in embodiments, design tool 112 enables a user of designer system 110 to simply and efficiently generate a functional software application design using natural language commands. For example, the natural language commands can include commands such as "add a picture of a cat," "add a text input box," "add a home button," "when the home button is pressed, load a home screen," as well as other commands that create or modify components of a user interface of a software application being designed. The natural language commands are intuitive user interface commands that logically reflect the desired action in the user interface being designed. For example, the natural language command "Add a home button" is a command to add a graphical user interface button element that resembles a home button, and which may be uttered by software developers and non-software developers alike. Continuing the example, a function can then be associated with the graphical user interface component via additional intuitive natural language commands, such as, "when the home button is pressed, load a home screen." This natural language command is a command that adds functional elements to the previously added graphical user interface element. In embodiments, design tool 112 utilizes speech-to-text and natural language processing to parse the natural language commands into their component parts, which are then transformed into one or more design commands (e.g., create a component, modify a component, remove an existing component, etc.). In embodiments, the natural language commands may be inputted into the design command as natural language audio commands spoken by a user, as well as via a command line interface as written natural language commands typed by the user. Graphical user interface inputs, such as moving elements around a design via mouse/pointer input, selecting design elements in the design tool, using copy and paste functions, undo/redo, etc. may also be used to generating design commands and/or refine existing components of a design.

In one embodiment, design tool 112 creates a design workspace 114 from the one or more design commands, where the design workspace holds the components of the software application being designed. In embodiments, the design workspace 114 includes built in components of the software application (e.g., a web page user interface shell, basic structural elements of a mobile device application user interface, etc.), custom components (e.g., components added through one or more natural language commands), one or more screens (e.g., user interfaces for the software application being designed which hold, display, or otherwise use the various built in components and custom components), and one or more goals associated with the application being designed (e.g., the purpose of the design, such as converting a sale with a shopping card user interface, collecting user profile data in a sign up screen, enticing a user to join a service from a sales page, etc.).

In embodiments, design tool 112 associates each element of a design in design workspace 114, including the user creating a design, the natural language utterances used to create design components, the initial design components associated with an utterance, the final design components associated with corresponding utterances, the workspace itself, etc., with globally unique identifiers (e.g., a hash value generated form one or more elements of a component). As will be discussed in greater detail below, the unique identification of each element enables component tracking during design creation and component tracking during design testing to enable machine learning using the tracking data. In embodiments, the tracking of natural language utterances to initial design components, and then to finalized design components, enables machine learning to refine the association between natural language design utterances and design commands (e.g., "Add a home button" initially adds the home button in the middle of a design, which can be refined to adding the home button in the upper left corner of a design based on several observed design modifications). Similarly, goal achievements can be tracked from testing of a functional design to determine the efficacy of different designs having the same goal. That is, the goals associated with design workspace 114 are used to track the effectiveness of a current design, alternative designs, and designs of other users sharing the same goal. In embodiments, as discussed in greater detail below, application design management server 130 tracks design effectiveness (e.g., design layouts, components used, screens used, sequences of screens, sequences of data, font sizes, background colors, number of screens, etc.) using one or more machine learning methods to train the natural language design processors for interpreting natural language commands into the most effective versions of those commands.

In embodiments, once design workspace 114 is finalized (e.g., a user of designer system 110 is satisfied with a current state of a design), design tool 112 generates a functional instance of the workspace, such as functional instance of application design 124, which is distributed and executed by one or more test system(s) 120. In embodiments, the built in components, custom components, and screens of design workspace 114 can be compiled and/or packaged for distribution. For example, a mobile device application may be compiled into executable form, whereas a web page based application is encoded into a browser recognizable form. The functional versions are then distributed by application design management server 130 to test system(s) 120. In embodiments, designer system 110 may also be used to execute a functional instance of the application design as a test system.

The test system(s) 120 then interact with the function instance of the application design 124 in order to provide feedback. In embodiments, the test system(s) 120 report session data associated with the interactions between users of test system(s) 120 and the functional instance of the application design 124. For example, the session data can include what components a user interacted with, how long a user used an application, a temporal flow between components, whether a goal was achieved, etc. The session data, which includes the unique identifiers associated with accessed elements, screens, use flows, etc., is then reported back to design tool 112 of designer system 110 and/or application design management server 130. Based on, for example, how a user interacts with a design (e.g., how long they used a design, how long it took to convert a goal of the design, whether a goal was ever achieved, the temporal flow between components of a design, etc.), one or more designers can alter the original design to create a new version of the design. The simple and intuitive natural language utterances that were used to create the design may then be used to alter the design. Furthermore, the alterations can also be tracked via unique identifiers associated with natural language design commands, components, etc. This enables further tracking of progress towards goals of a design.

In embodiments, the design tool 112 enables an easy process that any person (e.g., designer, developer, marketer, etc.) can use to generate a functional software application design using natural language commands. That is, uttering "add a 'submit' button to the bottom of the screen" can be issued by designers, software developers, marketers, etc., as the design tool is responsible for adding a corresponding encoded version of an application component. As a result, the design command expressed in natural language and the resulting design modification do not have to be expressed in written software code. Thus, the functional design is capable of rapid development because typical phase of development from a non-functional design to a functional design is not needed (e.g., design, develop, test, revised, develop, etc.). Furthermore, the resulting functional design is capable of being tested in actual use conditions by any number of test systems 120, from which valuable usage information can be obtained. From this usage information, further changes to the design are greatly simplified by utilizing additional natural language based editing that reduce the design and refinement life cycles. Finally, once a design is finalized, the encoded functional design may serve as a partially encoded application, which will save developers time, money, and effort when creating a final version of the application, as some of the development has already been completed by the design tool 112.

Figure 2:
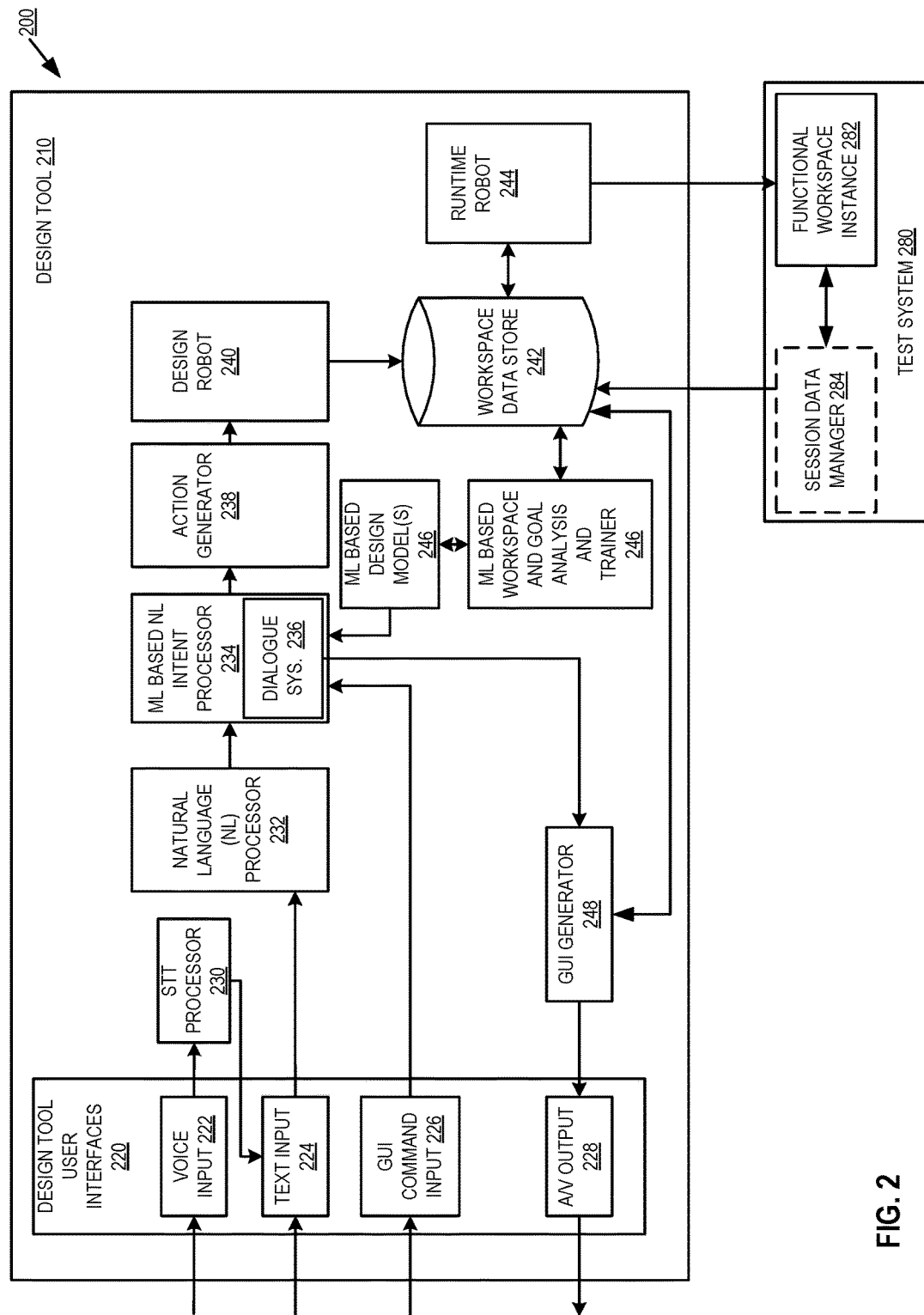
FIG. 2 is a block diagram of one embodiment of a design tool and a test system.

FIG. 2 is a block diagram of one embodiment 200 of a design tool 210 and a test system 280. Design tool 210 and a test system 280 provide additional details for the design tool and test systems discussed above in FIG. 1. Furthermore, the design tool 210 and a test system 280 communicate with each other over various networks and network configurations, as discussed above in FIG. 1.

In one embodiment, design tool 210 includes design tool user interfaces 220 including voice input 222, text input 224, graphical user interface (GUI) command input 226, and audiovisual (A/V) output 228. In one embodiment, voice input 222 may be a microphone of a computer system executing the design tool 210 capable of capturing utterances made by a user, such as spoken natural language commands (e.g., "add a home button," "when home button is pressed, load home screen," "add a data input filed," "add a web search bar," etc.). Each utterance is then fed into speech-to-text (STT) processor 230. In one embodiment, STT processor 230 is a machine learning trained speech recognition engine capable of transforming words in an utterance into text. The text transformation of an utterance is then transferred by STT processor to text input 224. Text input 224 captures written commands, such as written versions of the example utterances above, via a text input field displayed by GUI generator 248 of design tool 210.

In one embodiment, both the STT transformed natural language utterances and the text input are provided to natural language (NL) processor 232. In embodiments, the NL processor 232 breaks down the natural language input into entities. In embodiments, entities are meaningful components of a text input. For example, "add a home button" may be reduced to the entities "add," "home," and "button," with "a" excluded as a non-meaningful part of the textual input. In embodiments, the NL processor 232 may be a pre-trained machine learning NL processor trained for entity extraction.

The entity extracted version of the natural language utterance is then provided to machine learning (ML) based NL intent processor 234. In one embodiment, ML based NL intent processor 234 is responsible for structuring the entities extracted from the NL processor 232 into one or more intents, one or more actions, one or more contexts, and one or more goals. In embodiments, intents are what a design component is trying to achieve (e.g., utterance "home button" refers to a specific icon associated with a home screen of an application, "sign up" refers to one or more components intended to capture user information during a registration process, etc.), actions are generally in the form of creating or modifying an instance of a user interface component (e.g., adding a component to a design, removing a component from a design, modifying a user interface design, etc.), the context is the overall environment including an ongoing design, existing design components, structure of components, etc, and the one or more goals are what is to be achieved by a design (e.g., obtaining user contact information, completing a sale, getting assent to an agreement, etc.). In embodiments, the NL intent processor 234 is trained from training data to recognize intents, actions, contexts, and goals from entities extracted from natural language utterances. The training data may be loaded into workspace data store 242 and consumed by the ML based workspace and goal analysis trainer 246 prior to a first use of design tool 210. The training data may contain a set of common design utterances, and the resulting intents, actions, and contexts that should be extracted from the utterances. ML based workspace and goal analysis trainer 246 then generates one or more machine learning (ML) based design model(s) 246, such as deep learning models, artificial neural network models, etc., from the training data. ML based NL intent processor 234 is then able to use the trained ML based design model(s) 246 when structuring entities extracted from natural language utterances into intents, actions, contexts, and goals.

Furthermore, as discussed herein, each design component is uniquely identified, including the utterance used to create/modify the design component, the intent associated with the design component, an action taken from an utterance, a context, a goal, etc. This data is stored in workspace data store 242, and can be compared with an edited final version of the created/modified design component (e.g., to determine a finalized intent, finalized action, finalized context, etc.). In one embodiment, this data indicative of the ML based NL intent processor's 234 interpretation of an utterance and a finalized version of a user interface component can be fed back into ML based workspace and goal analysis trainer 246 to enable further training and/or refinement of the ML based design model(s) 246 based on actual usage of the design tool 210. The ongoing training and/or refinement of the ML based design model(s) 246 allow design tool 210 to become more intelligent and intuitive (e.g., make better interpretations of natural language utterances) as the design tool 210 is used, for example, for generating a plurality of designs by a plurality of designers.

In one embodiment, the ML based intent processor 234 attempts to determine an intent, action, and context with the least amount of information available (e.g., "Add a box that displays the current time" may be interpreted as "add a time box that displays the current PDT time"). In embodiments, ML based NL intent processor 234 makes assumptions about intents, actions, and contexts based on ML design model(s) 246 and the data composing an utterance. However, ML based intent processor 234 may not have enough information to determine an intent, action, and/or context, or make assumptions about the intent, action, and/or context. In one embodiment, dialogue system 236 may be activated to obtain additional information that ML based intent processor 234 will use to associate extracted entities with a design command. Dialogue system 236 queries a user via GUI generator 248 and A/V output 228 for additional information. In one embodiment, the queries may be pre-configured queries, for example, "please provide additional detail for an intent of this component" when an intent cannot be determined from an utterance, "what location do you want component placed at," as well as other pre-configured queries that can be issued by dialogue system 236. A response is received via one of the inputs 222, 224, and/or 226 and interpreted by ML based NL intent processor 234. When ML based NL intent processor 234 has sufficient information, the dialogue system 236 terminates the user queries.

In one embodiment, goals may also be extracted from ML based NL intent processor 234 from one or more utterances, as well as from an extracted context. For example, a goal may be explicitly set by a user creating a design (e.g., "Create a signup web page to sign up a new user"). However, a goal may be inferred from a context extracted from one or more utterances (e.g., the utterance "add a shopping cart checkout button" may enable an inference that the associated goal is to complete a sale). As yet a further example, dialogue system 236 may issue one or more queries to a user creating a design if a goal cannot be extracted from a design context and/or a goal has not been explicitly set.

In one embodiment, after the breaking down and analysis of a natural language utterance, the extracted intent, action, and context are then utilized by action generator 238 to determine an action to be executed with respect to the design. Furthermore, as discussed in greater detail below, a goal may also be used by action generator 238 to execute an action (e.g., based on intent, action, context, and goal). In embodiments, actions are typically in the form of creating or modifying an instance of a component at location x,y in a software application user interface being designed. In embodiments, the components are abstractions that define their respective functions (e.g., actions and responses), and not their respective visual representation. For example, a "button" components may be defined as an object that takes up a certain amount of space and responds to input, but there is no definition of the button's visual representation. The components visual representation is determined based on a theme applied to a software application user interface at runtime, a platform upon which a software application user interface is deployed, etc. These visual representations may be entirely different even though the actions/responses are the same in each environment. Therefore, action generator 238 creates or modifies an instance of an abstracted component, which are resolved at runtime according to the theme or platform in which the component is executed. In one embodiment, the abstracted component is a REACT™ component.

In one embodiment, the action generator 238 provides a payload containing the fully resolved intent, action, and context, which are associated with one or more unique identifiers, to design robot 240. The fully resolved intent, action, and context includes the ML based determination of intents and actions from the originally received utterances, modifications resulting from the dialogue system 236, and subsequent user modifications to a component being created/modified (e.g., user interface based position changes, size changes, etc.). Design robot 240 then performs the action with respect to a workspace containing the design being created. In one embodiment, design robot 240 determines a state transformation to move a workspace from a previous state (e.g., before the action associated with the component being created or modified is executed) and the resulting state of the workspace. The new state of the workspace is saved in workspace data store 242 and a state pointer is moved to the newly stored workspace state. In embodiments, workspace data store 242 stores the state transitions of each state of an application's design, and the actions taken in the design (e.g., execution of a payload based on intent, action, and context). By storing this data, the development of a design can be tracked from start to finish, a design replayed along with the original utterances that created each component in the design, designs re-used by reference to a specific state of a prior design, etc.

Figure 3:
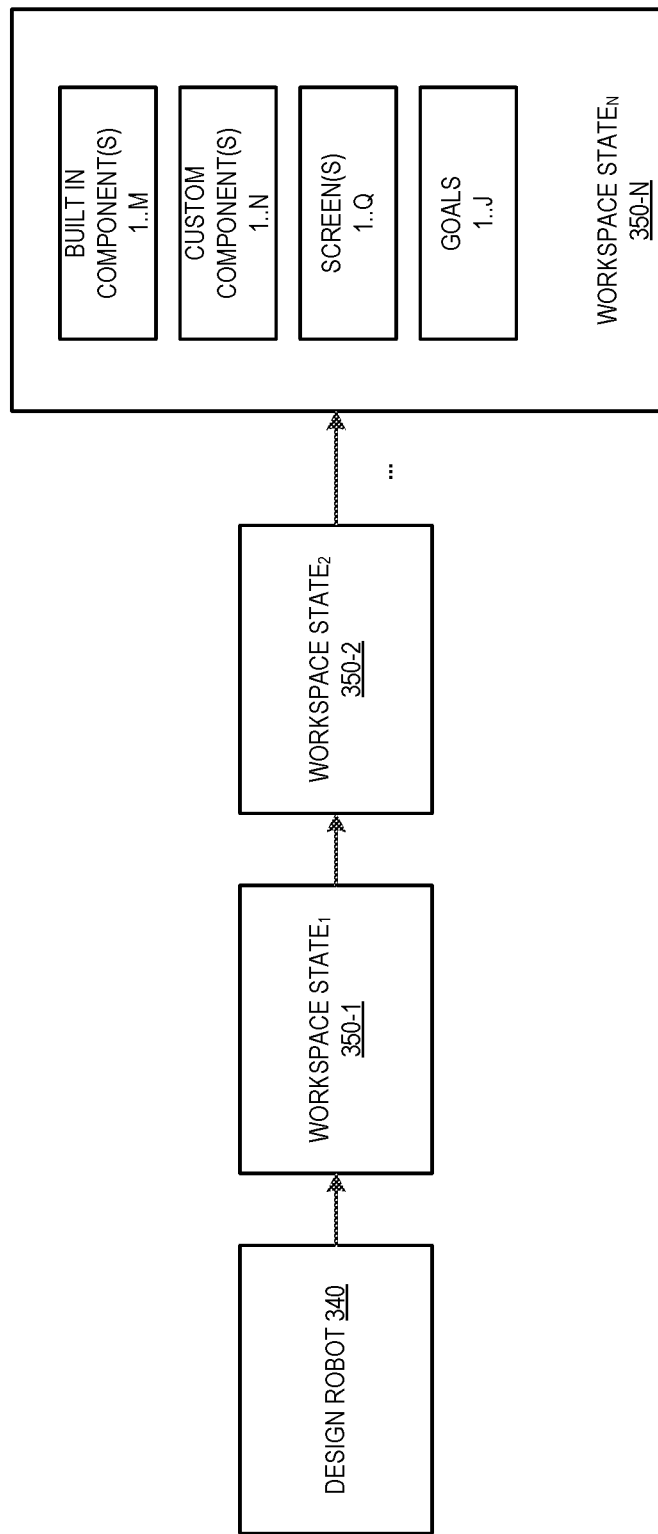
FIG. 3 is an exemplary diagram of a design robot generating different states of a workspace during the design of an application.

FIG. 3 is an exemplary diagram of a design robot 340 generating different states of a workspace (e.g., 350-1, 350-2, through 350-N) during the design of an application. In embodiments, when each action is executed by design robot 340, the state of the application being designed is transitioned to a new state. Furthermore, each state (e.g., 350-1, 350-2, through 350-N) may include the various built in components 1 . . . M, custom components 1 . . . N, screens of a user interface 1 . . . Q, and goals 1 . . . J of the workspace at that state. As discussed herein, each of these components can be uniquely identified by design tool. In another embodiment, each state (e.g., 350-1, 350-2, through 350-N) only stores a transformation from state Si→Si+1. Knowing the initial state of design, the transformations between each state, and the final state of the design, any intermediate state can be recreated by design tool 210.

Returning to FIG. 2, runtime robot 244 may then access workspace data store 242 to obtain a workspace including the components, screen, and goals of the workspace. In embodiments, the workspace is a design encoded with a plurality of abstracted components that are resolved at runtime according to the theme and/or platform in which it will be run. The design robot 244 therefore generates a functional workspace instance 282 from a design that can be distributed to a test system 280. In one embodiment, the design robot compiles the encoded workspace into an executable application for execution by test system 280. In another embodiment, design robot formalizes HTML or other browser executable code for rendering in a web browser at test system 280. In either embodiment, session data manager 284, which may be part of functional workspace instance 282, reports user runtime behavior with respect to the functional workspace instance 282 back to workspace data store 242 for storage along with the workspace being tested. As discussed herein, each components of the workspace is associated with a unique identifier. Thus, the session data may uniquely identify what components were accessed, in what order were they accessed, what pages were viewed, what order where the pages traversed, how long did a user view different components, whether a goal was achieved, how long it took for a goal to be achieved, etc.

Figure 4:
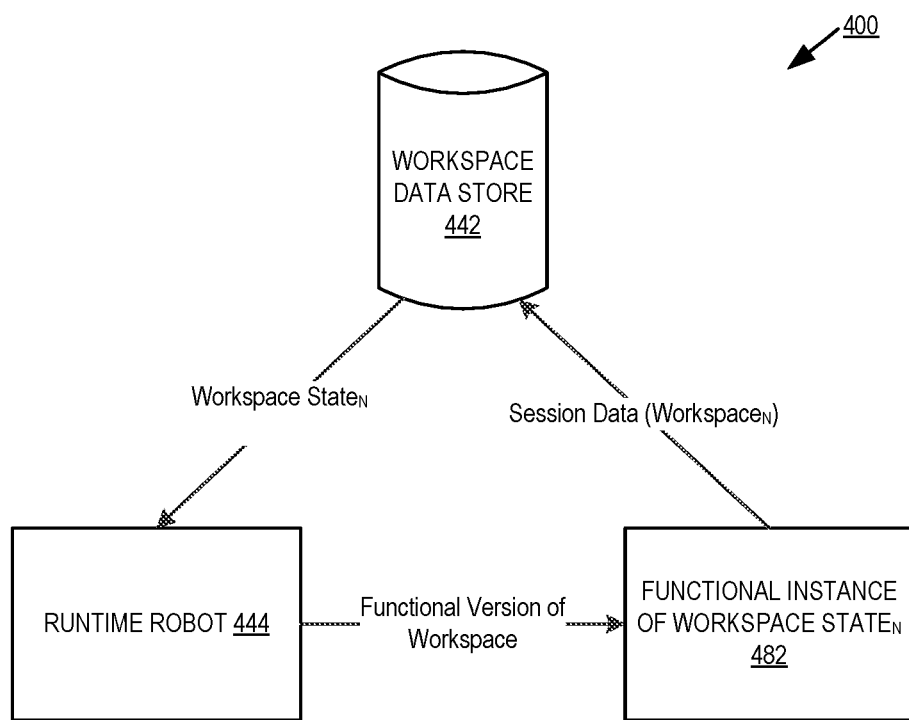
FIG. 4 is a block diagram illustrating one embodiment of communications exchanged between a runtime robot of a design tool, a functional instance of an application design during testing, and a workspace data store of a design tool.

FIG. 4 is a block diagram illustrating one embodiment 400 of communications exchanged between a runtime robot 444 of a design tool, a functional instance of an application 482 design during testing, and a workspace data store 442 of a design tool. As discussed herein, the runtime robot 444 transfers a functional version of a workspace (e.g., compiled into an executable application, formalized for viewing by a browser, etc.) to a testing system. The test system executes the functional instance of a workspace 482 (e.g., a workspace at state N) and captures user interactions with the various components of the functional instance of a workspace 482. Furthermore, the interactions by a user with specific components (e.g., submit button, buy button, reaching the bottom of a page, etc.) can be associated with goal completions, which can also be included in session data for workspace$_N$. The session data for workspace$_N$ is then transferred to the workspace data store 442. In embodiments, the session data may be transferred at the completion of testing, during testing, or a combination. In either embodiment, the interactions, unique identifiers associated with interactions, goal completion indications, etc. are stored in workspace data store 442 to provide a complete picture of a testing interaction with a workspace design.

Returning to FIG. 2, in embodiments, the testing session information stored in workspace data store 242 may then be accessed by GUI generator 248 and displayed to a user (e.g., to view and consider the efficacy of their design(s)). In embodiments, the testing session information can be aggregated across different users of the same design, aggregated across different or same users of different designs, aggregated across different designs having the same goal created by different designers, etc. Based on the review of testing information, a designer may determine that edits are needed to an existing design, that one of a plurality of states of the same design was the most effective, etc. Furthermore, these changes can be made simply and intuitively (e.g., via the natural language inputs discussed above). The changes are further integrated into an encoded version of a design that can be converted into a new functional workspace instance and tested, as discussed herein.

In one embodiment, the testing session information can also be read by ML based workspace and goal analysis and trainer 246 for further training one or more of the ML based design model(s) 246. In one embodiment, the model(s) 246, which are utilized by ML based NL intent processor 234 to interpret natural language utterances into intents, actions, contexts, and goals, may further be trained to base its interpretations and conclusions on the success of various design considerations (e.g. as reported by the session data and corresponding goal completion). In one embodiment, ML based workspace and goal analysis and trainer 246 may perform one or more machine learning training processes to associate intents, actions, and context with designs that achieve a common goal. For example, if a goal of a design is to obtain a new user sign up on a sign up page, designs having this goal can be analyzed by ML base workspace and goal analysis and trainer 246. The analysis can include generating a ML model based on the goal and various design characteristics in order to determine a design that most frequently, most efficiently, etc. achieves a design goal. Furthermore, as more designs are created by design tool, more training data becomes available to further refine goal based models, for examples to determine what designs are effective for specific goals, whether different geographical regions prefer different designs, whether specific demographics prefer different designs, etc.

In one embodiment, at the inception of a new design and/or as a design is being edited, the goal trained ML based design models) 246 enables ML based NL intent processor 234 and action generator 238 to not only interpret natural language commands into design components, but also to interpret commands, goals, etc. into the most successful version of a design component, placement of a design component, layout of a user interface, etc. Furthermore, once goals are trained into ML based design model(s) 246, larger design components associated with successful goal conversion (e.g., sets of design components) can be used to interpret NL design commands. For example, a designer may issue the natural language utterance "reate a web page for a shopping cart." The ML based design model(s) 246 trained to recognize the most successful shopping cart layout for a given consumer demographic, may be used by ML based NL intent processor 234 and action generator 238 to lay out a set of components according the goal ML trained design, may be used to generate an entire shopping cart according the goal ML trainer design, etc. In any of these embodiments, the most successful designs across different designers, different workspaces of the same designer, different workspaces for different designers, etc. enable the ML based NL intent processor 234 to create designs that reflect successful goal achievement.

In one embodiment, components of design tool 210 may be distributed between an application design management server 130 and a designer system 110. For example, designer system 110 may include a light front end (e.g., a web based design tool) that receives user inputs and renders a design interface GUI at the designer system 110. In this exemplary embodiment, speech-to-text processing, ML based analysis, action generation, and other computationally intensive operations would then be carried out at the server 130. This would enable a centralized location for supporting functional design creation for a plurality of remote designer systems 110. Furthermore, the deployment to multiple designer systems would enable the collection of session testing data from numerous designers, testing scenarios, from designs across many goals, etc. so that the trained ML based design model(s) 246 would receive the benefit and intelligence of the numerous sources of input.

In another embodiment, the design tool 210 may be executed almost entirely at a designer system 110 (e.g., user interfaces, speech-to-text processing, ML based analysis, action generation, etc.). In this embodiment, application design management server 130 may periodically updated, refine, and/or retrain ML based design model(s) 246, which can be distributed to designer system 110. Different distributions of design tool 210 processes and functions can be distributed between an application design management server 130 and a designer system 110 consistent with the discussion herein.

Figure 5:
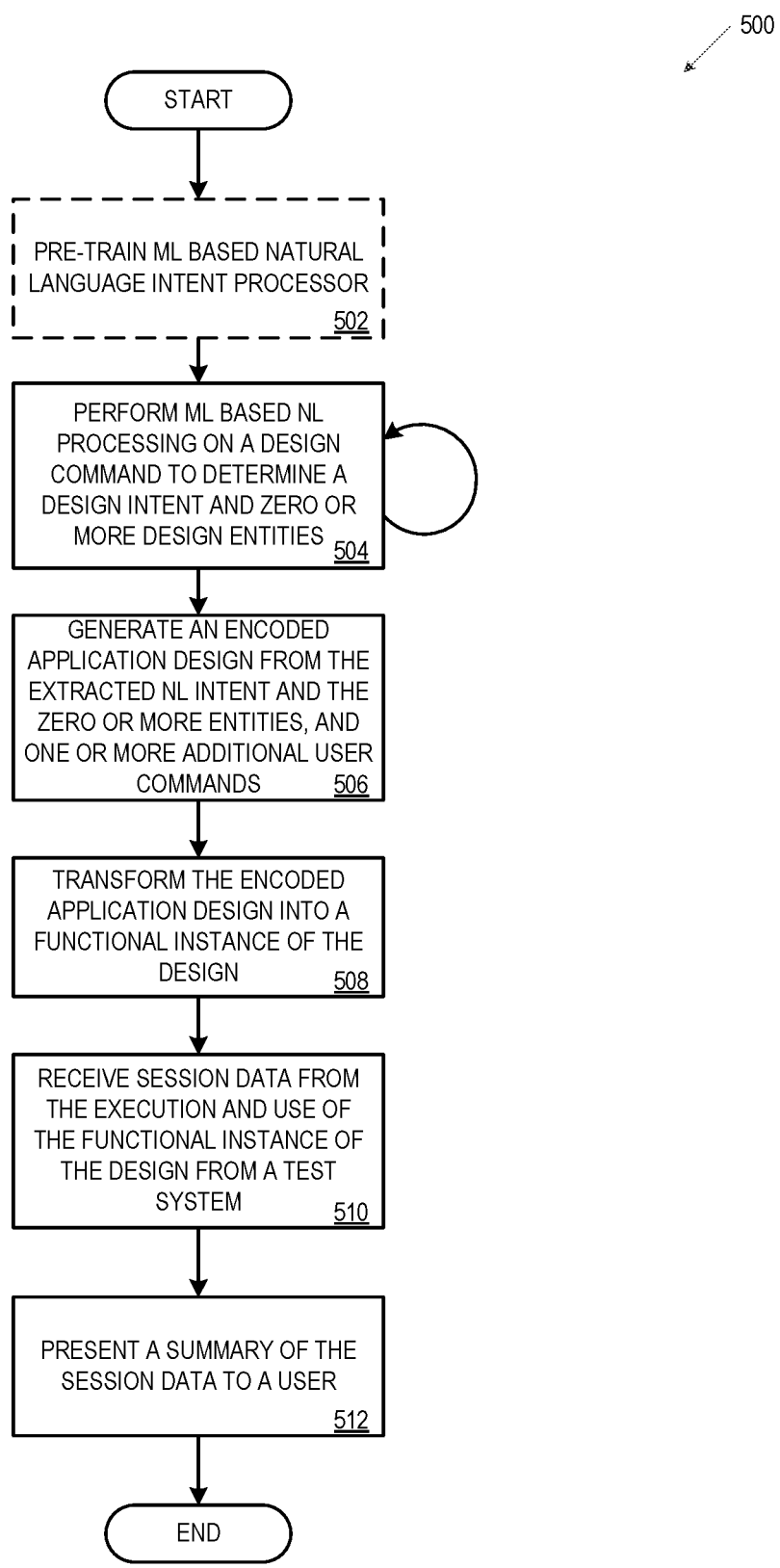
FIG. 5 is a flow diagram of one embodiment of a method for managing the design, distribution, and testing of a functional application design.

FIG. 5 is a flow diagram of one embodiment of a method 500 for managing the design, distribution, and testing of a functional application design. The method 500 is performed by processing logic that may comprise hardware (circuitry, dedicated logic, etc.), software (such as is run on a general purpose computer system or a dedicated machine), firmware, or a combination. In one embodiment, the method 500 is performed a design tool 110 or 210 executed by one or more of an application design management server 130 and a designer system 110.

Referring to FIG. 5, processing logic begins by pre-training a machine learning based natural language intent processor (processing block 502). In embodiments, as discussed herein, the natural language intent processor is responsible for interpreting natural language utterances, and extracting design intents (e.g., purpose of a design component), actions (e.g., whether the component should be created, modified, deleted, etc.), contexts (e.g., what is the overall environment either explicitly stated or implicitly determined from an ongoing design), and goals (e.g., what should design accomplish to be a successful design). In embodiments, the natural language intent processor is pre-trained prior to a first design use. However, as discussed herein, design component selection, modification, and testing usage, may be used to train one or more machine learning models that are used by natural language intent processor. Thus, in embodiments, the pre-training is not carried out by processing logic (as indicated by the dashed line).

Processing logic then performs a machine learning based natural language processing of a design command to determine a design intent and zero or more entities (processing block 504). For example, a natural language utterance, either verbal or text, may include the design command "create a button called home." The machine learning based natural language processing would extract the design intent "create component," and the entities "class=button, type=icon, value=home." Processing logic turns the extracted intent and entities into an action to generate an encoded application design (processing block 506). As discussed herein, the action can be the creation or modification of an abstracted design component, with parameters of the component defined by the extracted command entities (e.g., button, icon, and home), which is placed in an ongoing design by execution of the action by a design robot (e.g., design robot 240 executes create (button, icon, home)). Processing logic continues to receive natural language design commands (e.g., utterances), and executes actions on the visual representation of a design.

Processing logic then transforms the encoded application design into a function instance of the design (processing block 508). In one embodiment, the transforming of the design into a functional instance of the design is performed in response to a user command. Session data is then received by processing logic from the execution and use of the functional instance of the design from a test system (processing block 510). As discussed herein, each component of a design is uniquely identified, so that the session data reports a full picture of the usage of a functional instance of a design, including what components are used, how frequently, in what order, whether a goal was achieved, etc.

Processing logic then presents a summary of the session data to a user (processing block 512). As discussed above, the session data uniquely identifies design elements accessed during testing, a workspace containing the design, etc., which in turn can identify who created the design, the design's layouts, a state of the design, etc. In embodiments, the session data may be collected by processing logic at processing block 510 from a plurality of test systems testing the design. Therefore, the summary generated by processing logic at processing block 512 may be an aggregate summary of the testing data across several testers and/or several variations of a design. Furthermore, the testing data can be collected, correlated, and presented without any extra instrumentation of code, as the unique identification of components, usage patterns, goal achievement, etc. is obtained through the assignment of unique component identifiers discussed herein.

Figure 6:
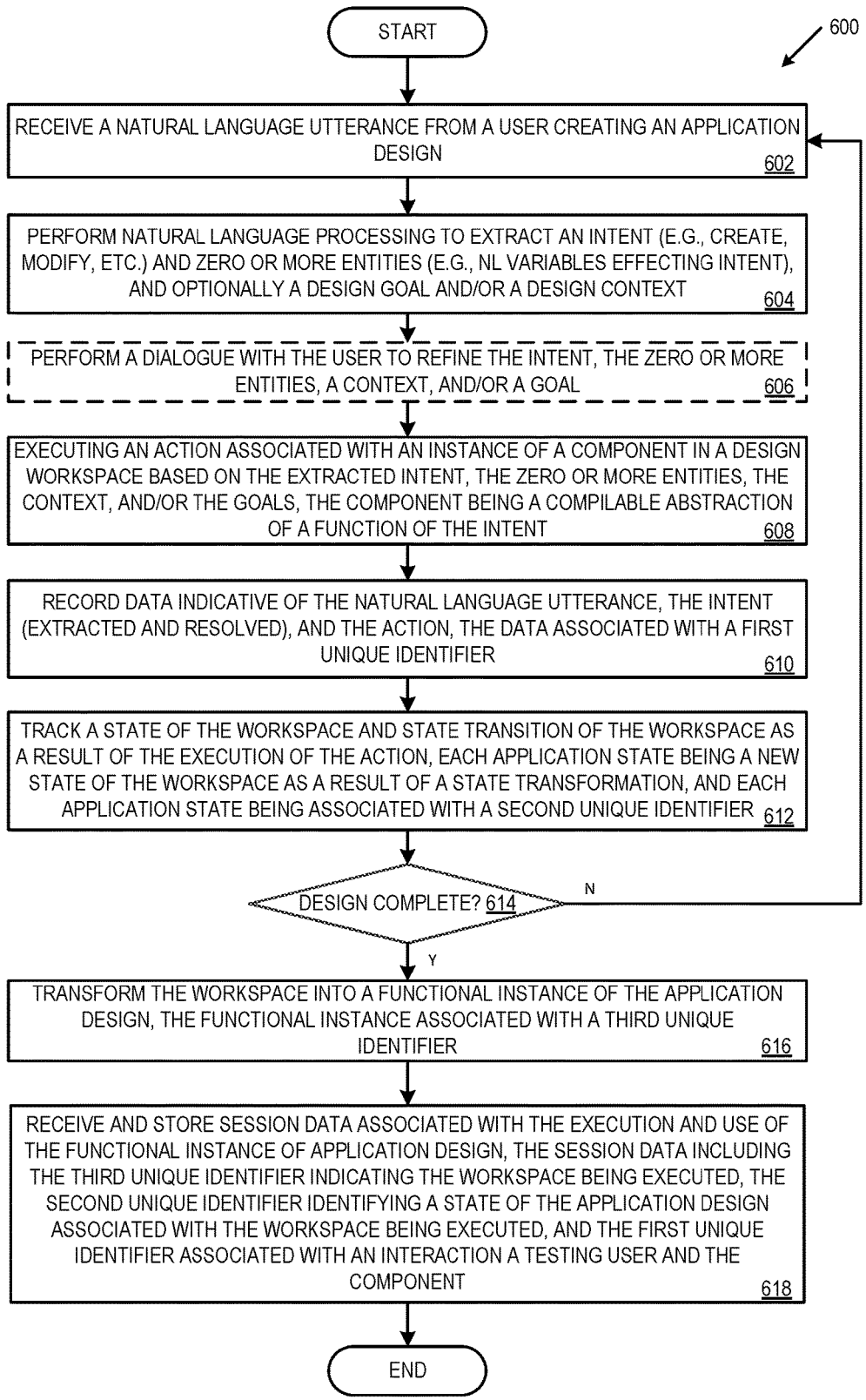
FIG. 6 is a flow diagram of another embodiment of a method for managing the design, distribution, and testing of a functional application design.

FIG. 6 is a flow diagram of another embodiment of a method for managing the design, distribution, and testing of a functional application design. The method 600 is performed by processing logic that may comprise hardware (circuitry, dedicated logic, etc.), software (such as is run on a general purpose computer system or a dedicated machine), firmware, or a combination. In one embodiment, the method 600 is performed a design tool 110 or 210 executed by one or more of an application design management server 130 and a designer system 110.

Referring to FIG. 6, processing logic begins by receiving a natural language utterance from a user creating an application design (processing block 602). As discussed herein, the utterance can be a verbal or written utterance associated with a design command, such as "create a home button," "add a shopping cart," "insert and link a new page to button X," etc. Processing logic uses the natural language utterance and performs natural language processing to extract an intent (e.g., create, modify, etc. defining the purpose of the design command), zero or more entities (e.g., natural language variable effecting the intent, such as button, home, box, text field, table, etc.), and optionally a design goal and/or design context (processing block 604). As discussed herein the design goal is the purpose of a design (e.g., convert a sale, capture a new sign up, etc.). The context is the overall environment of a design, such as whether a design is in a webpage or a mobile app, current layout of existing design components, any known goals, etc. Processing logic then optionally performs a dialogue with the user to refine the intent, the zero or more entities, the context, and/or the goals (processing block 606). In embodiments, processing logic attempts to infer information before entering a dialogue with a user by utilizes trained machine learning models during natural language processing (e.g., trained to interpret certain utterances with certain intents, actions, context, and/or goals). It is when processing logic cannot make an inference to missing information that the dialogue of processing block 606 is initiated.

Processing logic then executes an action associated with an instance of a component in a design workspace based on the extracted intent, zero or more entities, context, and/or goals, where the component is a compatible abstraction of a function of the intent (processing block 608). In the example utterance "create a button called home" discussed above, where "create" was determined to be the intent, and the entities were determined to be "button" and "home." The corresponding action executed in the design by processing logic would then be the function (create) with the variables (button, icon, home), with additional variables resolved before executing the action such as size, placement, visual appearance, etc. either resolved by assumption of processing logic or resolved via a dialogue with the user.

Along with execution of the action, processing logic further records data indicative of the natural language utterance, the intent (both extracted and resolved), and the action, where the data is associated with a first unique identifier (processing block 610). In one embodiment, the recordings of the original utterance, the extracted intent, the resolved intent, and the action performed in accordance with the resolved intent are each associated with unique identifiers, which are associated with one another. This enables processing logic to obtain a component level intelligence based on an original extracted intent and action with a resolved intent and action (e.g., processing logic interpreted "create home button" by placing a button called home in the center of a design, but a user repositioned the button to an upper left reflecting a resolved intent including the additional placement data).

Processing logic tracks a state of the workspace and state transition of the workspace as a result of the execution of the action, where each application state is a new state of the workspace as a result of a state transformation, and each application state being associated with a second unique identifier (processing block 612). In embodiments discussed above, processing logic may store a copy of each state of an application, each being identified by a unique identifier (e.g. the second unique identifier). Processing logic may alternatively store transition functions between states that enable different workspace states to be created via the cumulative execution of the transition functions. In this embodiment, the transition functions associated with the different states would be uniquely identified.

When a design is not complete (processing block 614), processing logic returns to processing block 602 to receive another natural language utterance. However, when the design is complete (processing block 614), processing logic transforms the workspace into a functional instance of the application design, the functional instance associated with a third unique identifier (processing block 616). In embodiments, the unique identifiers associated with each component of the functional design are retained in the compiled instance. This retention enables processing logic to receive and store session data associated with the execution and use of the functional instance of application design (processing block 618). In embodiments, the session data includes the third unique identifier indicating the workspace being executed, the second unique identifier identifying a state of the application design associated with the workspace being executed, and the first unique identifier associated with an interaction between a testing user and the component.

In embodiments, the different unique identifiers enable tracking usage of different workspaces back to individual components and the accumulation of usage statistics down to a component level. Such a granular source of data provides an invaluable insight into such factors as goal conversion based on different application designs, contexts, layouts, etc. Furthermore, the unique identification of components and acquisition of training usage data, provides a rich source of clean data for machine learning (e.g., for training one or more ML models for the goal achievement based natural language intent processing discussed herein). For example, having a clean source of data for different designs facets (e.g., different "subscriber signup screens" having different layouts, screen progressions, textual content, relative component placement, etc., each attempting to convert a user to sign up for a service) directed to the same goal (e.g., obtain a new user sign up), a ML based analysis can be performed for determining a design (e.g., components, layout, flow, etc.) that will provide the highest probability of goal conversion.

Figure 7:
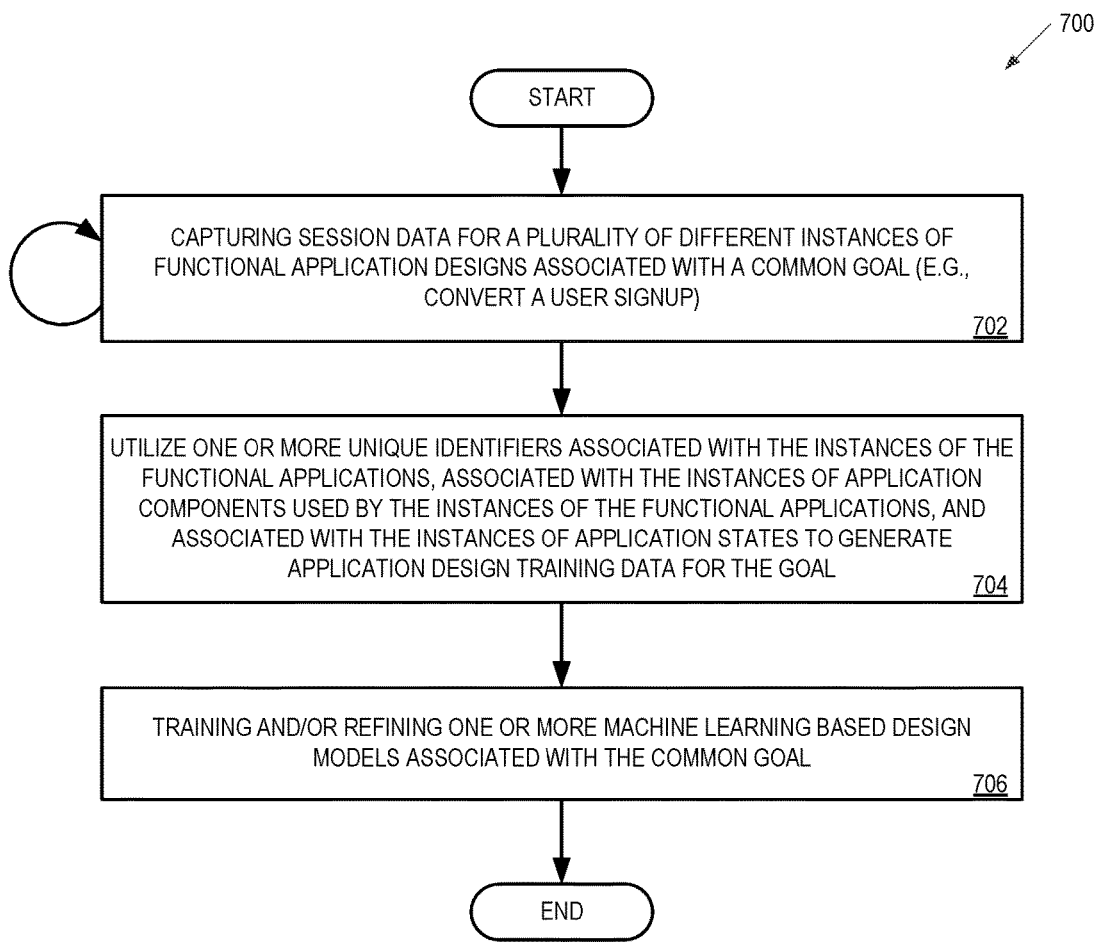
FIG. 7 is a flow diagram of one embodiment of a method for compiling functional design usage data to train and/or refine machine learning based design models.

FIG. 7 is a flow diagram of one embodiment of a method for compiling functional design usage data to train and/or refine machine learning based design models. The method 700 is performed by processing logic that may comprise hardware (circuitry, dedicated logic, etc.), software (such as is run on a general purpose computer system or a dedicated machine), firmware, or a combination. In one embodiment, the method 600 is performed a design tool 110 or 210 executed by one or more of an application design management server 130 and a designer system 110.

Referring to FIG. 7, processing logic begins capturing session data for a plurality of different instances of functional application designs associated with a common goal (e.g., convert a user signup) (processing block 702). In one embodiment, the common goal is used as the desired output of a machine learning model, such as a deep learning model, artificial neural network, etc. Additional factors, such as contexts (e.g., platform of execution, application type, etc.), design variables (e.g., layouts, components, pages, relative component positions, font size, color scheme, etc.) can serve as variable inputs into the machine learning model. As discussed above, the different functional application instances include uniquely identified components, thereby providing a rich source of clean machine learning training data. Processing logic therefore utilizes one or more unique identifiers associated with the instances of the functional applications, associated with the instances of application components used by the instances of the functional applications, and associated with the instances of application states to generate application design training data for the goal (processing block 704).

Processing logic then utilizes the training data to train and/or refine one or more machine learning models associated with the common goal (processing block 706). That is, processing logic trains the machine learning model to determine the combination of different design variables (e.g., layouts, color schemes, page flows, application contexts, font sizes, relative icon placements, etc.) that will provide the highest likelihood of achieving a goal.

Once this is known (e.g., a design and associated components that have the best likelihood of achieving a goal), the goal can be used to insert a set of user interface components in an application design. For example, a designer might make the natural language command "insert a signup page," "link product A to a checkout experience," etc. The machine learning based natural language processor (e.g., processor 234) can interpret that natural language utterance using the goal trained ML model associated with the goal and context to execute actions to provide the best version of a design associated with the utterance, such as placing a set of components in a specific configuration determined to achieve a best result.

Figure 8:
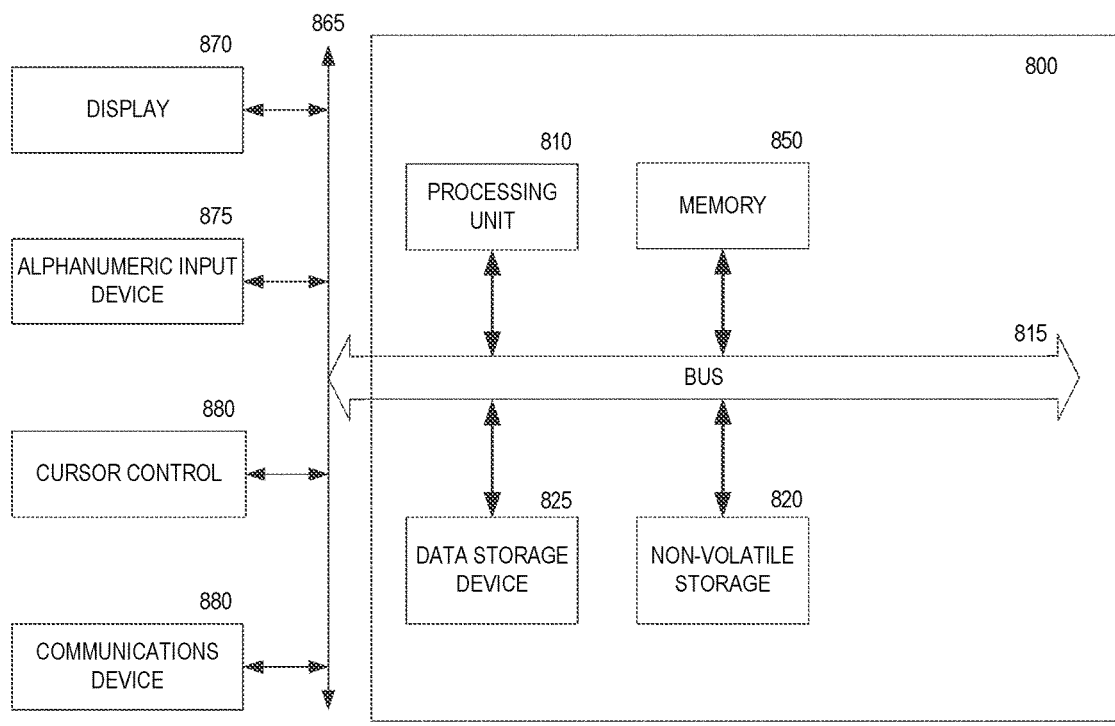
FIG. 8 is one embodiment of a computer system that may be used in accordance with an embodiment of the invention.

FIG. 8 is one embodiment of a computer system that may be used with the present invention. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a an liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments of the present invention.

It will be appreciated by those of ordinary skill in the art that any configuration of the system may be used for various purposes according to the particular implementation. The control logic or software implementing the present invention can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The present invention may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

In one embodiment, the access to electronic communications, tracking of communications, extraction of contact, collaborator, and relationship data from the electronic communications, and sharing of electronic communications is predicated on the privacy controls maintained by a relationship management server. The privacy controls enable users to select what data should be shared with participants (i.e., relationships and collaborators) within a process, what data should be tracked, what data from one user can be shared, displayed, or used by a second user, etc. In one embodiment, these privacy controls may initially be set to a maximum degree of privacy, such that no data is shared, obtained, or tracked. A user may then opt-into one or more of the data acquisition, tracking, and sharing processes discussed herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

I claim:

1. A computer implemented method for generating functional application designs, the method comprising:
   receiving, by a design tool, one or more natural language utterances corresponding to natural language design commands for editing an application being designed;
   editing, by the design tool, one or more components of the application being designed based on each of the natural language utterances; and
   generating, by the design tool, a functional instance of the application being designed, wherein generating the functional instance of the application being designed comprises:

analyzing, by a natural language processor, a natural language utterance from the one or more natural language utterances to extract one or more entities from the natural language utterance, wherein each of the extracted one or more entities is a component part of the natural language utterance;

determining, by a machine learning based natural language intent processor, an intent of the natural language utterance with respect to the application being designed;

determining, by the machine learning based natural language intent processor, an action that implements the determined intent in the application being designed, wherein the one or more extracted entities are variables that define the determined intent in the design command;

executing, by the design tool, the design command that creates or modifies a component in the application being designed based on the determined action; and saving, by the design tool, the application being designed as a workspace that includes the created or modified component.

2. The method of claim 1, wherein each of the natural language utterance, the extracted one or more entities, the determined intent, the design command, the component of the application being designed, and the workspace are each associated with respective unique identifiers.

3. The method of claim 2, further comprising:
distributing the functional instance of the application being designed to at least one test system;
receiving session data indicative one or more interactions between a user of a test system and the functional instance of the application; and
storing the session data in a workspace data store.

4. The method of claim 3, further comprising:
determining a goal associated with the application being designed, wherein the goal comprises a purpose of the design, and wherein the session data includes data indicative of whether or not the goal was achieved during testing by the user of the test system;
aggregating session data for one or more applications being designed that share the goal;
performing a machine learning analysis using the aggregated session data and components of the one or more applications being designed as inputs to train a machine learning model for achieving the goal; and
determining, by the machine learning based natural language intent processor, the intent of the natural language utterance with respect to the application being designed using the trained machine learning model for achieving the goal.

5. The method of claim 3, further comprising:
aggregating session data associated with the application being designed; and
presenting the session data to a user generating the application being designed.

6. The method of claim 1, further comprising:
determining a context associated with the application begin designed, wherein the context comprises an environment in which the application being designed will be executed, a set of one or more components that make up the application being designed, a placement of one or more components, a structure of one or more pages of a design, or a combination thereof; and
determining the intent, based at least in part, on the determined context.

7. The method of claim 1, further comprising:
saving a state of the workspace for each executed design command, wherein the state comprises a transition function representing the design command that is applied to a prior state of the workspace, wherein any state of the workspace can be recreated by cumulatively applying transition functions from an initial workspace state to a desired workspace state.

8. The method of claim 1, further comprising:
receiving a natural language request to further modify the component created or modified in the application being designed based on the determined action;
storing data indicative of the determined intent as an initial intent associated with the natural language utterance;
storing data indicative of a resolved intent, wherein the resolved intent comprises an intent and zero or more entities associated with the natural language request to further modify the component, and wherein the resolved intent is further associated with the natural language utterance associated with the initial intent; and
performing a machine learning analysis using the initial intent and the resolved intent to refine a machine learning model for the analysis of intent and entity extraction from natural language utterances.

9. The method of claim 1, wherein the component comprises an abstraction of a component that defines actions and responses of the component without a definition of a visual representation of the component, and wherein the visual representation is resolved at runtime when the application being designed is executed for testing.

10. The method of claim 1, wherein a natural language utterance from the one or more natural language utterances is a verbal utterance of a user of the design tool, further comprising:
analyzing the verbal utterance with a speech to text processor; and
transforming the verbal utterance to text that corresponds to the verbal utterance.

11. The method of claim 1, wherein a natural language utterance from the one or more natural language utterances is a written utterance of a user of the design tool.

12. A non-transitory computer readable storage medium including instructions that, when executed by a processor, cause the processor to perform a method for generating functional application designs, comprising:
receiving, by a design tool, one or more natural language utterances corresponding to natural language design commands for editing an application being designed;
editing one or more components of the application being designed based on each of the natural language utterances; and
generating, by the design tool, a functional instance of the application being designed, wherein generating the functional instance of the application being designed comprises:
analyzing, by a natural language processor, a natural language utterance from the one or more natural language utterances to extract one or more entities from the natural language utterance, wherein each of the extracted one or more entities is a component part of the natural language utterance;
determining, by a machine learning based natural language intent processor, an intent of the natural language utterance with respect to the application being designed;

determining an action that implements the determined intent in the application being designed, wherein the one or more extracted entities are variables that define the determined intent in the design command;

executing the design command that creates or modifies a component in the application being designed based on the determined action; and saving the application being designed as a workspace that includes the created or modified component.

13. The non-transitory computer readable storage medium of claim 12, wherein each of the natural language utterance, the extracted one or more entities, the determined intent, the design command, the component of the application being designed, and the workspace are each associated with respective unique identifiers.

14. The non-transitory computer readable storage medium of claim 13, further comprising:

distributing the functional instance of the application being designed to at least one test system;

receiving session data indicative one or more interactions between a user of a test system and the functional instance of the application; and storing the session data in a workspace data store.

15. The non-transitory computer readable storage medium of claim 14, further comprising:

determining a goal associated with the application being designed, wherein the goal comprises a purpose of the design, and wherein the session data includes data indicative of whether or not the goal was achieved during testing by the user of the test system;

aggregating session data for one or more applications being designed that share the goal;

performing a machine learning analysis using the aggregated session data and components of the one or more applications being designed as inputs to train a machine learning model for achieving the goal; and determining, by the machine learning based natural language intent processor, the intent of the natural language utterance with respect to the application being designed using the trained machine learning model for achieving the goal.

16. The non-transitory computer readable storage medium of claim 14, further comprising:

aggregating session data associated with the application being designed; and presenting the session data to a user generating the application being designed.

17. The non-transitory computer readable storage medium of claim 12, further comprising:

determining a context associated with the application begin designed, wherein the context comprises an environment in which the application being designed will be executed, a set of one or more components that make up the application being designed, a placement of one or more components, a structure of one or more pages of a design, or a combination thereof; and determining the intent, based at least in part, on the determined context.

18. The non-transitory computer readable storage medium of claim 13, further comprising:

saving a state of the workspace for each executed design command, wherein the state comprises a transition function representing the design command that is applied to a prior state of the workspace, wherein any state of the workspace can be recreated by cumulatively applying transition functions from an initial workspace state to a desired workspace state.

19. The non-transitory computer readable storage medium of claim 12, further comprising:

receiving a natural language request to further modify the component created or modified in the application being designed based on the determined action;

storing data indicative of the determined intent as an initial intent associated with the natural language utterance;

storing data indicative of a resolved intent, wherein the resolved intent comprises an intent and zero or more entities associated with the natural language request to further modify the component, and wherein the resolved intent is further associated with the natural language utterance associated with the initial intent; and performing a machine learning analysis using the initial intent and the resolved intent to refine a machine learning model for the analysis of intent and entity extraction from natural language utterances.

20. The non-transitory computer readable storage medium of claim 12, wherein the component comprises an abstraction of a component that defines actions and responses of the component without a definition of a visual representation of the component, and wherein the visual representation is resolved at runtime when the application being designed is executed for testing.

21. The non-transitory computer readable storage medium of claim 12, wherein a natural language utterance from the one or more natural language utterances is a verbal utterance of a user of the design tool, further comprising:

analyzing the verbal utterance with a speech to text processor; and transforming the verbal utterance to text that corresponds to the verbal utterance.

22. The non-transitory computer readable storage medium of claim 12, wherein a natural language utterance from the one or more natural language utterances is a written utterance of a user of the design tool.

23. A system for generating functional application designs, the system comprising:

a memory; and a processor coupled with the memory to:

receive one or more natural language utterances corresponding to natural language design commands for editing an application being designed, edit one or more components of the application being designed based on each of the natural language utterances, and generate a functional instance of the application being designed, wherein generate a functional instance of the application being designed comprises:

analyze a natural language utterance from the one or more natural language utterances to extract one or more entities from the natural language utterance, wherein each of the extracted one or more entities is a component part of the natural language utterance;

determine an intent of the natural language utterance with respect to the application being designed;

determine an action that implements the determined intent in the application being designed, wherein the one or more extracted entities are variables that define the determined intent in the design command;

execute the design command that creates or modifies a component in the application being designed based on the determined action; and save the application being designed as a workspace that includes the created or modified component.

24. The system of claim 23, further comprising the processor to:

save a state of the workspace for each executed design command, wherein the state comprises a transition function representing the design command that is applied to a prior state of the workspace, wherein any state of the workspace can be recreated by cumulatively applying transition functions from an initial workspace state to a desired workspace state.

25. The system of claim 23, further comprising the processor to:

receive a natural language request to further modify the component created or modified in the application being designed based on the determined action;

store data indicative of the determined intent as an initial intent associated with the natural language utterance;

store data indicative of a resolved intent, wherein the resolved intent comprises an intent and zero or more entities associated with the natural language request to further modify the component, and wherein the resolved intent is further associated with the natural language utterance associated with the initial intent; and perform a machine learning analysis using the initial intent and the resolved intent to refine a machine learning model for the analysis of intent and entity extraction from natural language utterances.

* * * * *